(12) United States Patent
Bedjaoui et al.

(10) Patent No.: US 10,193,110 B2
(45) Date of Patent: Jan. 29, 2019

(54) ELECTROCHEMICAL DEVICE, SUCH AS A MICROBATTERY OR AN ELECTROCHROMIC SYSTEM, COVERED BY AN ENCAPSULATION LAYER COMPRISING A BARRIER FILM AND AN ADHESIVE FILM, AND METHOD FOR FABRICATING ONE SUCH DEVICE

(71) Applicant: COMMISSARIAT À L'ENERGIE ATOMIQUE ET AUX ENERGIES ALTERNATIVES, Paris (FR)

(72) Inventors: Messaoud Bedjaoui, Voreppe (FR); Sylvain Poulet, Saint Victor de Cessieu (FR); Thomas Sebastien, Saint-Martin-le-Vinoux (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 253 days.

(21) Appl. No.: 15/086,717

(22) Filed: Mar. 31, 2016

(65) Prior Publication Data
US 2016/0293905 A1 Oct. 6, 2016

(30) Foreign Application Priority Data
Mar. 31, 2015 (FR) ...................... 15 52698

(51) Int. Cl.
*H01M 2/02* (2006.01)
*H01M 2/04* (2006.01)
(Continued)

(52) U.S. Cl.
CPC ............ *H01M 2/026* (2013.01); *G02F 1/155* (2013.01); *G02F 1/1525* (2013.01); *G02F 1/161* (2013.01); *H01M 2/0207* (2013.01); *H01M 2/0275* (2013.01); *H01M 2/0277* (2013.01); *H01M 2/0287* (2013.01); *H01M 2/06* (2013.01); *H01M 10/052* (2013.01); *H01M 10/0585* (2013.01); *B32B 37/02* (2013.01); *B32B 37/12* (2013.01); *B32B 38/10* (2013.01); *B32B 2307/202* (2013.01); *B32B 2457/10* (2013.01);
(Continued)

(58) Field of Classification Search
None
See application file for complete search history.

(56) References Cited

U.S. PATENT DOCUMENTS

2008/0003493 A1  1/2008  Bates

FOREIGN PATENT DOCUMENTS

| EP | 2166609 A1 | 3/2010 |
| FR | 3009437 A1 | 2/2015 |
| KR | 20120076187 A | 7/2012 |

*Primary Examiner* — Yoshitoshi Takeuchi
(74) *Attorney, Agent, or Firm* — Oliff PLC (57) ABSTRACT

An electrochemical device, such as a microbattery or an electrochromic system, including at least one stack of active layers containing lithium, said stack being arranged on a substrate and being covered by an encapsulation layer. The encapsulation layer includes at least: a barrier film presenting at least one electrically insulating surface and including at least one layer hermetic to oxidising species, said adhesive film including a juxtaposition of electrically conducting adhesive strips and of electrically insulating adhesive strips, and an adhesive film, provided with a first surface and a second surface, the first surface being in contact with the electrically insulating surface of the barrier film and the second surface covering the stack of active layers and a part of the substrate.

24 Claims, 6 Drawing Sheets

(51) Int. Cl.
*H01M 2/08* (2006.01)
*H01M 6/40* (2006.01)
*H01M 10/0585* (2010.01)
*H01M 10/04* (2006.01)
*H01M 10/052* (2010.01)
*G02F 1/155* (2006.01)
*G02F 1/161* (2006.01)
*H01M 2/06* (2006.01)
*B32B 37/12* (2006.01)
*G02F 1/153* (2006.01)
*B32B 37/02* (2006.01)
*B32B 38/10* (2006.01)

(52) U.S. Cl.
CPC .. *G02F 2001/1536* (2013.01); *G02F 2202/28* (2013.01); *H01M 2220/30* (2013.01)

ELECTROCHEMICAL DEVICE, SUCH AS A MICROBATTERY OR AN ELECTROCHROMIC SYSTEM, COVERED BY AN ENCAPSULATION LAYER COMPRISING A BARRIER FILM AND AN ADHESIVE FILM, AND METHOD FOR FABRICATING ONE SUCH DEVICE

BACKGROUND OF THE INVENTION

The invention relates to an electrochemical device, such as a microbattery or an electrochromic system, covered by an encapsulation layer comprising a barrier film and an adhesive film, and a method for fabricating one such device.

STATE OF THE ART

Microbatteries are defined as being all-solid electrochemical generators formed by an active stack of thin layers which form the (positive and negative) electrodes separated by an electrolyte.

The positive electrode is formed from a material having a good ionic conductivity, for example titanium sulfoxide (TiOS) or a lithiated metal oxide, such as $LiCoO_2$, $LiNiO_2$, or $LiMn_2O_4$.

The electrolyte is an electric insulator having a high ionic conductivity such as lithium and phosphorus oxynitride (LiPON), LiSON, LiBON, $Li_2SO_4$, $LiNbO_3$, etc.

Finally, the nature of the negative electrode varies according to the technology of the microbattery. In microbatteries called "lithium-ion" microbatteries, the negative electrode is formed by a lithiated material, i.e. a material in which lithium ions are inserted. In "lithium-metal" microbatteries, the negative electrode is exclusively formed by lithium.

The stack of the battery is completed by anodic and cathodic current collectors.

However, materials containing lithium are very sensitive to air, and in particular to oxygen and moisture. To prevent them from oxidising, they have to be covered by an inert and tightly sealed encapsulation system. Mastering encapsulation is a factor of prime importance which conditions the efficiency of the microbatteries over time.

Implementation of these encapsulation systems can be performed in two different manners: encapsulation in thin layers, also referred to as monolithic encapsulation, and encapsulation by means of an add-on part, also referred to as heterogeneous encapsulation.

In the case of monolithic encapsulation, the encapsulation layers are deposited directly on the electrochemical device.

Heterogeneous encapsulation is a solution based on the addition of a cover that is airtight with respect to the atmosphere. The latter case is considered as being one of the most robust solutions to efficiently protect lithium microbatteries on account of its ease of implementation, its low cost and its performances. In this technology, the encapsulation system is fabricated separately before being fitted in place on the active layers of the microbattery.

Figure 1:
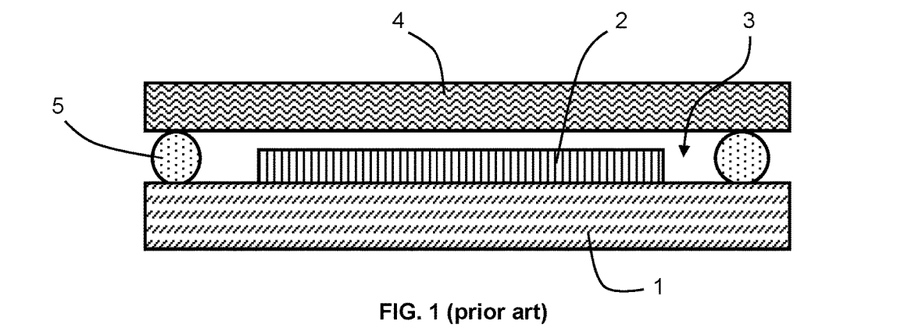
FIGS. 1 and 2 represent lithium microbatteries according to the prior art, in schematic manner, in cross-section.

FIG. 1 schematically represents a lithium microbattery provided with an encapsulation system by add-on part, as described in the document US2008/0003493.

The microbattery comprises a stack 2 of active layers formed on a substrate 1. The stack 2 is contained in a cavity 3 delineated by the substrate 1 and by a cover (lid) 4 facing the substrate. The cover is for example made from glass, ceramic or metal. A bead 5 of adhesive material, such as epoxy, secures the cover 4 to the substrate 1, around the stack of active layers 2.

To simultaneously ensure securing of the cover 4 on the substrate, the bead of glue 5 occupies a vast area around the stack 2. A large surface of the substrate is thus dedicated to the cavity 3 and to the sealing bead 5, to the detriment of the useful surface of the microbattery.

Figure 2:
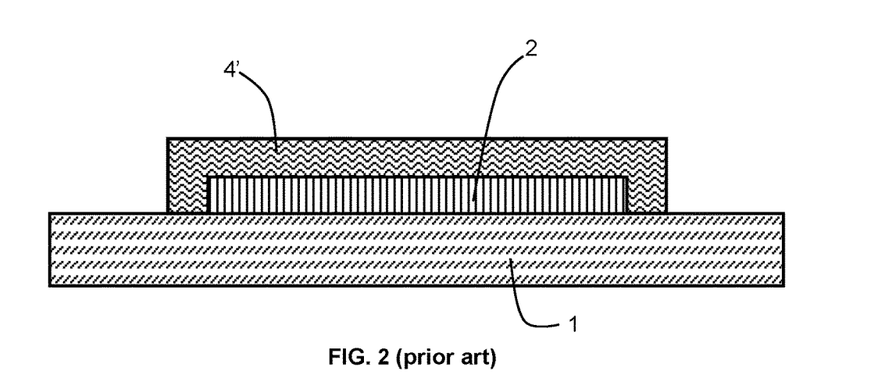

In another example of this document, illustrated in FIG. 2, the cover 4' is formed by a stack of three layers, two polymer layers enclosing a metallic layer. The cover is arranged on the substrate and is secured to the substrate by lamination.

To form batteries in large quantity, a network of microbatteries is formed on a single substrate. A bead of adhesive is deposited around each stack of active layers and a cover is then formed on the stack. The resin is then polymerized to secure the covers to the substrate.

In existing methods, each individual microbattery is therefore encapsulated in individual manner. However, the substrates supporting the microbatteries may comprise from several tens to several thousands of unitary components.

At the present time, these encapsulation methods by sticking unitary covers are not suitable for producing a large volume of microbattery.

This problem is also encountered in electrochromic systems. Electrochromic devices are devices which colour due to the action of an electric field.

The devices present a similar architecture to microbatteries—they comprise an active electrode and a counter-electrode separated by an electrolyte. The active electrode is conventionally composed of an electrochromic material that is able to reversibly and simultaneously insert ions and electrons.

Insertion of the ions has to be reversible in order to obtain devices presenting a good cycling stability.

The active layers also have to be protected from the atmospheric elements by an encapsulation system.

It is observed that a requirement exists to provide a lithium microbattery or an electrochromic system of small dimensions, with an efficient and compact encapsulation device and that is able to be used for producing devices with a high throughput rate.

OBJECT OF THE INVENTION

The object of the invention is to remedy the shortcomings of the prior art, and in particular to propose an electrochemical device, such as a microbattery or an electrochromic system, presenting an efficient and compact encapsulation device and a method for fabricating such a device, said method being able to be used to produce devices in large quantity.

This objective is achieved by an electrochemical device such as a microbattery or an electrochromic system comprising at least one stack of active layers containing lithium, said stack comprising at least a first electrode connected to a first current collector and at least a second electrode connected to a second current collector, said stack being disposed on a substrate and being covered by an encapsulation layer.

The encapsulation layer comprises at least:

a barrier film presenting at least one electrically insulating surface and comprising at least one layer hermetic to oxidising species, an adhesive film, provided with a first surface and a second surface, the first surface being in contact with the electrically insulating surface of the barrier film and the second surface covering a stack of active layers and a part of the substrate, the adhesive film comprising a juxtaposition of electrically conducting adhesive strips and of electrically insulating adhesive strips, two electrically conducting strips being separated by an electrically insulating strip to be electrically insulated from one another, each electrically conducting strip being connected to the first current collector or to the second current collector of the stack of active layers.

This object is also achieved by a method for fabricating an electrochemical device, such as a microbattery or an electrochromic system, comprising the following successive steps:

providing a substrate on which at least one stack of active layers is arranged, said stack comprising at least a first electrode connected to a first collector and at least a second electrode connected to a second collector, providing a barrier film and an adhesive film
the barrier film presenting at least one electrically insulating surface and comprising at least one surface hermetic to oxidising species,
the adhesive film being provided with a first surface and a second surface,
the adhesive film comprising a juxtaposition of electrically conducting adhesive strips and of electrically insulating adhesive strips,
two electrically conducting strips being separated by an electrically insulating strip to be electrically insulated from one another, securing the barrier film and the adhesive film with the substrate so as to encapsulate the stack of active layers, the barrier film and the adhesive film forming an encapsulation layer, the first surface of the adhesive film being in contact with the electrically insulating surface of the barrier film and the second surface of the adhesive film being designed to be partially in contact with the substrate, the adhesive film covering the stack of active layers and a part of the substrate, each strip of electrically conducting material being connected to the first and second collectors of the stack of active layers.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

The method for fabricating an electrochemical device, such as a microbattery or an electrochromic system, comprises the following successive steps:

(i) providing a substrate 1 on which at least a stack of active layers 2 containing lithium is arranged, said stack comprising at least a first electrode connected to a first current collector and at least a second electrode connected to a second current collector, (ii) providing a barrier film 11 and an adhesive film 12
the barrier film 11 presenting at least one electrically insulating surface and comprising at least one surface hermetic to oxidising species,
the adhesive film 12 being provided with a first surface and a second surface, (iii) optionally, forming pass-through openings 19 through the barrier film 11, (iv) securing the barrier film 11 and the adhesive film 12 with the substrate so as to encapsulate the stack of active layers 2,
the first surface of the adhesive film being in contact with the electrically insulating surface of the barrier film 11 and the second surface of the adhesive film being designed to be partially in contact with the substrate, the barrier film 11 and the adhesive film 12 forming an encapsulation layer 13.

Advantageously, the adhesive film 12 continuously covers the stack of active layers 2 and a part of the substrate 1.

Preferentially, the interface between the barrier film 11 and the substrate 1 forms a continuous ring around the stack of active layers 2.

Step (i) requires the provision of a substrate on which at least one stack of active layers 2 containing lithium is arranged, i.e. a microbattery devoid of an encapsulation layer 13.

Figure 3:
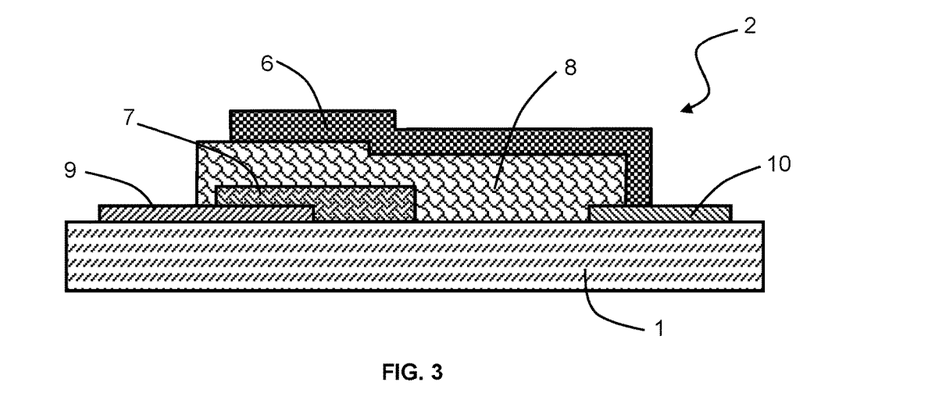
FIG. 3 represents a microbattery, in schematic manner and in cross-section.

FIG. 3 schematically represents a lithium microbattery. The microbattery conventionally comprises a stack 2 of active layers deposited on one surface of the substrate 1.

The stack of active layers 2 comprises at least a first electrode and a second electrode—a negative electrode 6 (anode) and a positive electrode 7 (cathode). The positive electrode 7 is formed from a layer of lithium insertion material, such as TiOS, $TiS_2$, LiTiOS, $LiTiS_2$, $LiCoO_2$, $V_2O_5$ etc.

The anode 6 is made from a material exclusively formed by metallic lithium (Li-metal battery) or from a lithiated insertion material ($NiO_2$, SnO, Si, Ge, C, etc.) (lithium-ion battery).

The stack of active layers 2 also comprises an electrolyte layer 8 situated between the two electrodes.

The electrolyte layer 8 is preferably made from lithium and phosphorus oxynitride (LiPON). It could also be made from LiPONB or LiSiCON.

The purpose of the encapsulation layer 13 is to protect the active layers from oxidation, and more particularly the electrode 6 situated at the top of the stack of active layers 2 opposite the substrate 4.

The top electrode is in fact the active layer that is the most exposed to oxidising species. It is also the layer which in general contains the most lithium, i.e. the anode. This particular configuration of the electrodes makes the encapsulation step even more critical.

The microbattery also comprises current collectors: a cathodic current collector 9 and an anodic current collector 10. The current collectors are of metallic nature (titanium, gold, aluminium platinum, tungsten for example) and are arranged on the host substrate 1.

The host substrate 1 can be made from silicon, glass, or any other type of material suitable to act as support for fabricating microbatteries.

The stack can be produced by means of any technique known to the person skilled in the art.

The encapsulation method can be performed on a single microbattery. It can also be used to simultaneously encapsulate several microbatteries: several stacks of active layers, arranged on the same host substrate 1, are encapsulated simultaneously by a single encapsulation layer.

The microbatteries can be arranged in such a way as to be connected in parallel or in series.

Figure 4:
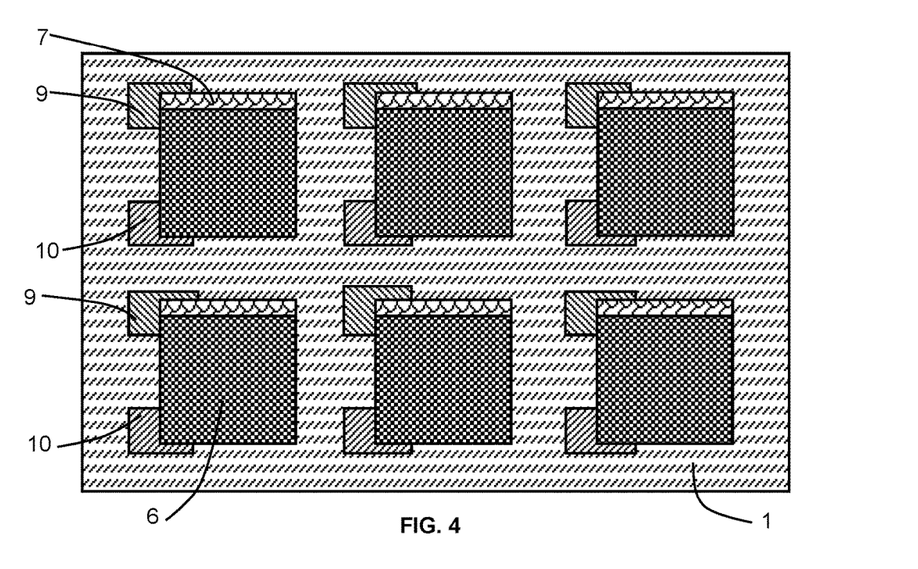
FIGS. 4 and 5 represent several microbatteries arranged on a substrate, according to different embodiments, in schematic manner and in top view.

FIG. 4 is a schematic representation, in top view, of an electrochemical device comprising several stacks of active layers 2 (here a group of six batteries) arranged on a single host substrate 1.

The stacks of active layers 2 are arranged in the same plane parallel to the surface of the substrate. The stacks are not superposed on one another along an axis perpendicular to the surface of the substrate.

The stacks of active layers can be connected in parallel: the first electrically conducting strip connects the first current collectors of the stacks of active layers and the second electrically conducting strip connects the second current connectors of the stacks of active layers.

For example, a first electrically conducting strip can be arranged so as to connect only the anodic current collectors of the stacks of active layers.

A second electrically conducting strip can be arranged so as to connect only the cathodic current collectors of the stacks of active layers.

Figure 5:
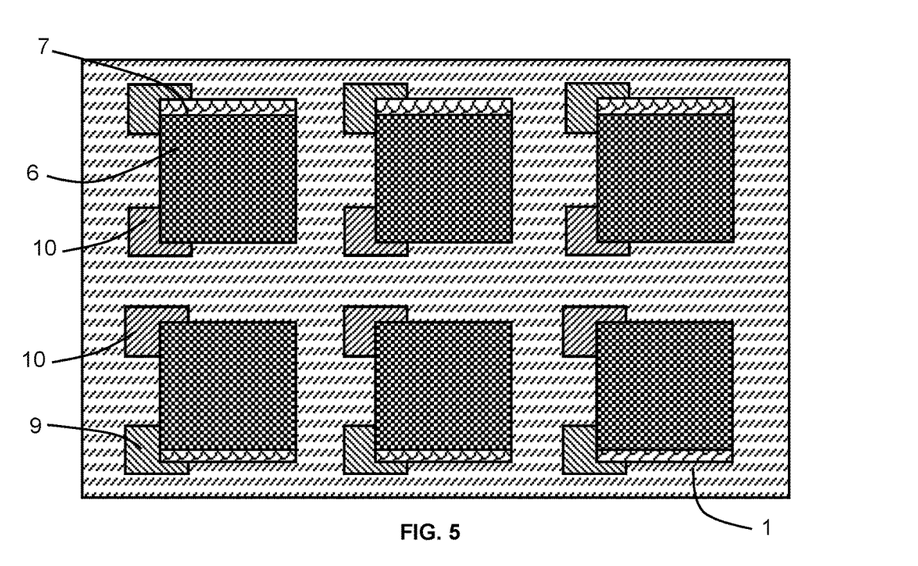

According to another embodiment, the electrochemical device comprises several stacks of active layers so as to form microbatteries arranged in series (FIG. 5).

Each electrically conducting strip connects a first current collector of a stack of active layers with a second current collector of another stack. For example, an electrically conducting strip can connect an anodic current collector of a first stack of active layers with a cathodic current collector of a second stack of active layers.

These configurations are given for illustrative purposes only. A different number of microbatteries can be used.

Step (ii) consists in providing the barrier film 11 and the adhesive film 12.

The barrier film 11 and adhesive film 12, once assembled, will form the encapsulation layer 13.

These films are formed and/or assembled independently from formation of the active layers on the substrate.

The barrier film 11 is electrically insulating and comprises at least one layer that is hermetic to oxidising species.

The barrier film 11 is advantageously chosen both for these barrier properties and also for these mechanical properties.

The film can be a monolayer film, i.e. the barrier film is formed by a single layer.

According to a preferred embodiment, the barrier film 11 is a multilayer film: it is formed by a stack of layers of different natures.

The stack of layers is oriented along an axis perpendicular to the surface of the substrate 1.

The layer or layers forming the barrier film 11 are advantageously made from metal or from dielectric material.

These materials present good barrier properties against the oxidising parts present in the atmosphere ($H_2O$, $N_2$, $O_2$).

The performances of the protection barrier are defined by the permeation rate of the oxidising species. For lithium microbatteries, the barrier level sought for is generally situated between $10^{-4}$ and $10^{-5}$ $g/m^2/day$.

The barrier level is advantageously less than $10^{-4}$ $g/m^2/day$.

When the barrier film 11 is a single-layer film, the dielectric material is for example glass, a ceramic, mica or any dielectric material able to be made in the form of a thin layer and able to form a barrier for oxidising species.

Advantageously, a single-layer barrier film made from glass, mica or ceramic for example, acts as a cover. Such covers can be achieved in the form of strips presenting thicknesses of less than 50 μm. Such thicknesses are advantageously compatible with lamination processes.

In the case of a stack of several layers, the first layer of the barrier film is a layer of dielectric material.

What is meant by first layer of the barrier film is the layer located between the adhesive film 12 and the other layers of the stack of the barrier film 11.

In the case where the barrier film comprises at least two layers, the barrier film advantageously comprises a barrier layer made from metal, such as aluminium, and an insulating layer, for example made from polymer, to advantageously insulate the metal layer from the adhesive film.

The insulating layer does not necessarily present barrier properties against oxidising species.

The metallic thin layers can be combined with thin layers made from thermoplastic material.

The metallic thin layers, or thin sheets, advantageously present good barrier properties against oxidising species.

The metallic thin layers are for example made from a material having a base formed by aluminium or steel, which may be coated by one or more alloy layers (white iron, black iron, chrome iron, stainless steel, etc.).

Advantageously, the thin layers of thermoplastic material enhance the mechanical strength of the barrier film 11.

The thermoplastic polymers are preferably chosen from PEN (polyethylene naphtalate), PP (polypropylene), PET (polyethylene terephtalate), PC (polycarbonate), PI (polyimide), and PES (polyethersulfone). Another polymer suitable for multilayer structures can also be used.

According to another embodiment, these polymers can be covered by one or more external layers (aluminium, copper, silver, $SiO_x$, $AlO_x$, etc.) or by one or more internal layers (inclusion of mineral charges, additions of oxidant absorbers).

The purpose of the coating of the polymers is to improve the barrier properties of the polymers against oxidants. The thermal properties are also improved.

The polymer/coating assembly can thus withstand temperatures of up to 200° C., allowing a larger number of assembly methods to be used.

The thicknesses of the different metallic thin layers and of the thin layers of thermoplastic material are advantageously less than 300 μm.

Advantageously, the thickness of the adhesive layers is at least equal to the thickness of the stack of active layers 2.

According to a preferred embodiment, the barrier film 11 of the encapsulation layer 13 is obtained by a lamination process of a thin layer of PET with a thickness of 15 μm on a thin layer of aluminium with a thickness of 15 μm.

The other part forming the encapsulation layer 13 is an adhesive film 12.

The purpose of the adhesive part is to perform connection by direct bonding of the barrier film 11 on the host substrate 1 containing the components to be encapsulated.

In addition to its adhesive role, the adhesive part made from polymer material advantageously absorbs the variations of volume of the microbattery during the charge and discharge cycles.

The adhesive part of the encapsulation system presents a thickness ranging from a few microns to a few tens of microns. These relatively small thicknesses advantageously enable the flanks of the microbattery to be totally covered and lateral diffusion of the oxidants to be limited. This diffusion is particularly reduced with the electrically conducting strips formed by polymer layers doped by addition of metallic inclusions enhancing the barrier properties of the polymers.

The thickness of the adhesive part is also chosen according to the surface topography of the components to be encapsulated.

The adhesive film is preferably formed by a juxtaposition of electrically conducting adhesive strips 16 and of electrically insulating adhesive strips 17, in a direction which is parallel to the surface of the substrate which supports the stack. Depending on the embodiments, the adhesive film can be parallel to the substrate or substantially parallel to the substrate. The adhesive film may not be parallel to the substrate but the electrically conducting and electrically insulating strips alternate in a direction parallel to the surface of the substrate.

What is meant by juxtaposition is that the strips are arranged next to one another, that they do not overlap, and that there is no space between the strips so as to form a continuous film.

The electrically insulating strips and electrically conducting strips are alternated in a direction parallel to the surface of the substrate 1.

At least a first strip and a second strip of electrically conducting material are separated by at least one strip of electrically insulating material.

The first and second strips of electrically conducting material are electrically insulated from one another.

Figure 6:
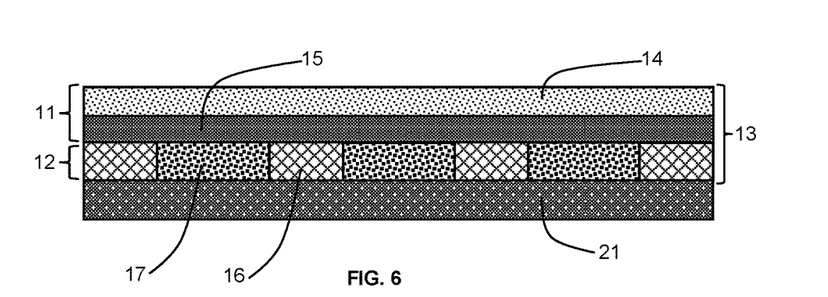
FIG. 6 represents an encapsulation layer according to a particular embodiment of the invention, in schematic manner and in cross-section.

FIG. 6 is a schematic representation of the principle of juxtaposition of the electrically conducting strips 16 and of the electrically insulating strips 17.

Other architectures, arrangements of electrically conducting strips 16 and electrically insulating strips can be envisaged. For example, the strips 16 and/or 17 can be bevelled in several different manners.

The arrangement of the electrically conducting strips 16 and of the electrically insulating strips 17 has to be performed so as to make a part or all of the electrically conducting strips 16 correspond with a part or all of the connecting pads of the current collectors 9, 10 of the components to be protected.

Each strip of electrically conducting material is connected to the first or second current collector of the stack.

There is therefore at least a first strip and a second strip of electrically conducting and adhesive material that are respectively connected to the first electrode and to the second electrode of the stack of active layers 2 via the current collectors.

The electrically conducting strips 16 and insulating strips are chosen not only for their bonding and adhesion properties but also for their chemical and mechanical compatibilities with the layers of the barrier film 11 of the encapsulation layer 13.

The adhesion strength is for example between 1 N/cm and 10 N/cm.

The electrically insulating strips 17 and the conducting strips advantageously have identical thicknesses and equivalent or even identical elasticity and thermal properties in order to increase the lifetime of the device. What is meant by identical is to within a 5% margin.

The electrically insulating strips 17 have an electric resistivity of more than $10^9$ Ωm. They can be obtained from thermoplastic (polyethylene, polyimide, etc.) or thermosetting (silicone, epoxide, etc.) polymer films, by UV curing or heat treatment for example.

The electrically conducting strips 16 have an electric conductivity of more than $10^2$ S·m$^{-1}$. The conducting strip is preferentially made from conducting polymer.

Even more preferentially, the electrically conducting strip is made from adhesive conducting polymer.

The conducting polymer can be intrinsically conductive. In this case, it is advantageously chosen from polyacetylene, polythiophene, polypyrrole, or phenylene polysulfide.

According to another alternative, the conducting polymer is formed from an insulating polymer doped with metallic (silver, copper, platinum, etc.) or conducting carbonated charges.

According to a particular embodiment, the adhesive parts present adhesive properties on the two main surfaces, i.e. the first surface designed to be in contact with the barrier film 11 and the second surface designed to be in contact with the substrate.

This embodiment is preferable in the case where the barrier and adhesive films are assembled by lamination. The insulating or conducting adhesive parts can for example be in the form of two-face ribbons made from acrylic, silicone, rubber or a mixture of these materials.

For example purposes, it is possible to use Tesa60260 adhesive conductors with a thickness of 25 μm coupled with Tesa61562 insulating adhesives with a thickness of 25 μm to respectively form the electrically conducting strips 16 and the insulating strips of the adhesive part. These adhesives are marketed by the Tesa company.

Other types of adhesive strips can be used to form the adhesive parts of the encapsulation systems. We can, for indicative and non-restrictive purposes, cite the adhesives marketed by Henkel—Ablefilm ECF550, Ablefilm ECF561E, Ablefilm 563K, etc. or marketed by 3M—1007N, 8006C, 3007, 9703 etc.

The adhesive polymers can also be pressure-sensitive adhesive polymers.

The choice of materials is made so as to obtain a good chemical compatibility between the adhesive strips and the active layers of the components to be encapsulated.

For example, in the case of components with a real surface of 1 cm×1 cm, spaced 1 mm apart on 200 mm wafers, the electrically insulating strips present a width and a length of 0.8 cm×20 cm and the electrically conducting strips present a width and a length of 0.5 cm×20 cm.

According to a particular embodiment, the adhesive film comprises traps for oxidising species (getters) such as for example water.

These traps can be used in fabrication of the electrically conducting strips 16 and/or of the electrically insulating strips 17. The materials of said traps can for example be mixed with the materials forming said strips.

For exhaustive and non-restrictive purposes, the getters can be made from a material chosen from zeolites, silica, alumina, alkaline metal oxides, metals or their alloys. Fabrication of the getters can be adapted according to the fabrication methods of the electrically insulating and electrically conducting strips. The getters can be present in the form of a wire, ribbon, powders or thin layers. As far as the implementation method is concerned, the person skilled in the art can choose between the different techniques of the state of the art, such as for example deposition methods by centrifuge (spin coating), deposition by sol-gel method or by the other thin layer deposition methods (chemical vapor deposition (CVD), physical vapor deposition (PVD) and so on).

As indicated above, the encapsulation layer 13 is formed by the barrier film 11 and by the adhesive 12 which is itself formed by electrically insulating strips 17 and electrically conducting strips 16. In a particular embodiment, the barrier properties of the electrically conducting strips are different from the barrier properties of the electrically insulating strips. It is then advantageous to modify the arrangement of the strips 16 and 17 so as to form an adhesive 12 which enables improved barrier performances to be had by complexifying the lateral diffusion paths inside the adhesive 12. For example, if the electrically conducting strips 16 present better barrier performances than the electrically insulating strips 17, it is advantageous to modify the arrangement of the strips 16 and 17 to make lateral diffusion through the insulating strips 17 more difficult. An opposite configuration can be achieved if the electrically insulating strips have better performances than the electrically conducting strips on the barrier properties.

To perform step (iv), the barrier film 11 and adhesive film 12 can, according to a first embodiment, be assembled to one another before being secured with the substrate. In this case, the encapsulation layer 13 is deposited in a single step on the substrate.

According to another embodiment, assembly of the encapsulation layer 13 is performed in two successive deposition steps: a first step to deposit the adhesive film 12 and a second step to deposit the barrier film 11.

The adhesive film 12 is, in a first step, secured with the substrate. The barrier film 11 is assembled and then subsequently secured on the adhesive film 12.

Deposition of the encapsulation layer 13 in a single step requires the adhesive film 12 to be previously secured with the barrier film 11 in order to form the encapsulation layer. The encapsulation layer will then be deposited on the substrate 1.

The adhesive film 12, formed by conducting and insulating adhesive strips juxtaposed to one another, can be associated with the barrier film 11 by dispensing, lamination or by coating, so as to form the encapsulation layer 13. Preferentially, the barrier part and the adhesive part are assembled by lamination.

The encapsulation layer 13 obtained is represented in FIG. 6.

The encapsulation layer 13 is configured to encapsulate at least one stack of active layers 2 of the electrochemical device, arranged on a substrate 1. The encapsulation layer 13 comprises a stack of layers comprising at least:

a barrier film 11 presenting at least one electrically insulating surface and comprising at least one layer hermetic to oxidising species, an adhesive film 12, provided with a first surface and a second surface, the first surface being in contact with the electrically insulating surface of the barrier film 11, the adhesive film 12 comprising a juxtaposition of electrically conducting adhesive strips 16 and of electrically insulating adhesive strips 17.

At least a first and second strip of electrically conducting material are separated by at least one strip of electrically insulating material, the first and second strips of electrically conducting material being electrically insulated from one another.

The encapsulation layer 13 is advantageously self-supported and conformable to be able to absorb the profile of the components arranged on the substrate.

What is meant by self-supported is a part which remains mechanically integral when handled. The encapsulation layer, prepared independently from the active layers, can be transferred onto the active layers.

What is meant by conformable is that the encapsulation layer presents a substantially uniform thickness.

According to the preferred embodiment, the encapsulation layer, also called encapsulation system or part, has a total thickness of between 30 µm and 100 µm.

The thermal (resistance and coefficient of expansion), elasticity (Young's modulus) and flexibility properties of the adhesive film 12 and of the barrier film are advantageously comparable to prevent any deformation of the encapsulation system when the add-on operations are performed.

What is meant by comparable is for example that the coefficients of expansion of the adhesive film 12 and of the barrier film 11 do not differ by more than 5%.

The compressibility properties of the two parties are also advantageously equivalent in order to prevent a possible interruption of adhesion between the adhesive part and the barrier film part 11 or between the adhesive part and the devices to be encapsulated when the encapsulation layer 13 is deposited.

What is meant by equivalent is that the compressibility properties do not differ by more than 5%.

According to a particular embodiment, before being assembled on the host substrate 1, the encapsulation layer 13 can comprise a protective film 21 (FIG. 6). The protective film 21 is arranged on the adhesive film 12. The protective film 21, also called liner, advantageously enables the encapsulation layer 13 to be mechanically consolidated, in particular during the handling operations, before the deposition step, and protects the adhesive film 12.

The protective film 21 is removed before the encapsulation layer 13 is transferred onto the host substrate 1.

The protective film 21 is chemically inactive with respect to the adhesive film 12.

The protective film is for example a film of polymer material. It can for example be a film of PEN (polyethylene naphtalate), PP (polypropylene), PET (polyethylene terephtalate), PC (polycarbonate), PI (polyimide), or PES (polyethersulfone). It presents a thickness of the few tens of microns.

The encapsulation layer 13 is for example formed by a stack comprising:

a barrier film 11 formed by an aluminium/PET bilayer, an adhesive film 12 formed by a juxtaposition of electrically conducting strips 16 and insulating strips Tesa60260/Tesa61562, a protective film 21.

The encapsulation layer 13 presents a total thickness of about 55 µm.

According to a particular embodiment, the encapsulation layer 13 comprises oxidising species traps to improve and limit the problem of lateral permutation of the adhesive part.

The encapsulation layer 13 is then transferred onto the substrate so as to encapsulate the active layers.

The encapsulation layer, formed by the barrier film and the adhesive film, is secured with the substrate by lamination or by a sealing technique.

What is meant by sealing is placing of the encapsulation layer on the substrate with at least partial sticking of the layer on the substrate, for example by soldering associated with a compression, a thermocompression or UV treatment.

Preferentially, the encapsulation layer 13 is secured to the substrate with a lamination process. This process enables the different imbricated parts to be efficiently assembled. It can be performed in a vacuum or in a controlled atmosphere. This step can for example be performed in a glovebox, the moisture and oxygen content being less than 5 ppm, or it can be performed in an anhydrous clean room.

The lamination conditions have to be adjusted according to the nature of the adhesives used.

For example, the assembly between an aluminium/PET/adhesives encapsulation layer 13 and the active components can be performed at a temperature of 90° C. with a pressure of more than 1 bar and a rate of less than 3 m/mn.

According to another embodiment, the encapsulation layer 13 is secured to the substrate by cross-linking of the adhesive film 12.

The adhesive film 12 of the encapsulation layer 13 can, in this case, be a liquid polymer. Strips of insulating and conducting liquid polymers are deposited alternately on the barrier film 11, for example by coating.

The encapsulation layer 13 is transferred onto the substrate. The adhesive film 12 is then cross-linked by exposure under UV or by heat treatment so as to secure the encapsulation layer 13 with the host substrate 1.

The barrier film 11 is, in this configuration, transparent to UV rays.

Figure 7A:
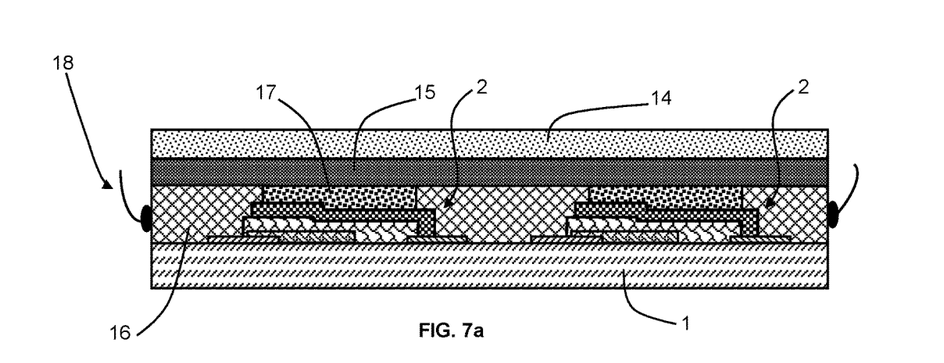
FIGS. 7 to 9 represent several microbatteries covered by an encapsulation layer according to different embodiments, in schematic manner and in cross-section.
Figure 7B:
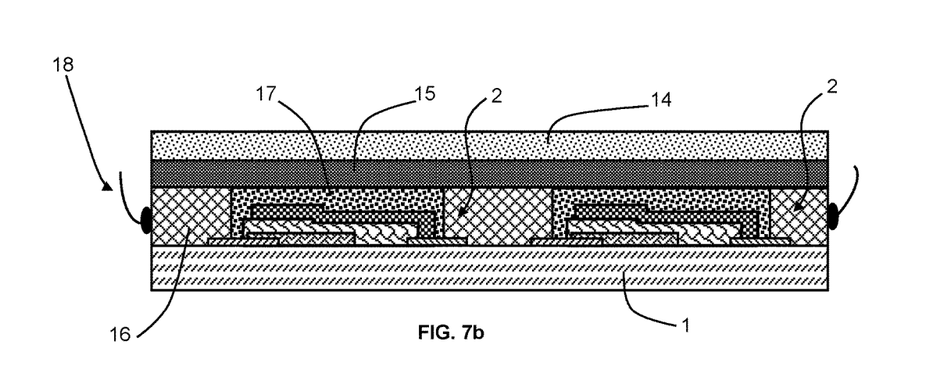
Figure 7C:
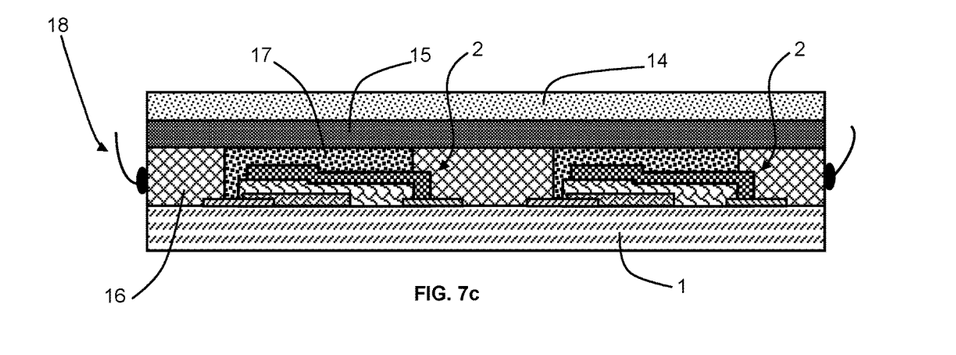

The microbattery obtained is represented in FIGS. 7*a*, *b* and *c*.

After the encapsulation layer 13 has been secured with the substrate, contact connections 18 are positioned at the level of the lateral surfaces of the electrically conducting strips. The possibility of locating the contacts remotely, outside the active areas, enables external connections of a set of batteries to be made with other microelectronic devices.

FIGS. 7*a*, 7*b* and 7*c* represent different alternative embodiments in which the electrically insulating layer either totally or partially covers the flanks of the active layers.

The embodiment of FIG. 7*a* advantageously corresponds to the case where the electrically conducting strips are anisotropic films presenting a vertical conduction.

In the other cases (FIGS. 7*b* and 7*c*), at least one of the flanks of each stack of active layers is totally covered, protected by an electrically insulating strip, so as to prevent short-circuiting within the device.

As represented in FIG. 7*b*, the side flanks of the stacks of active layers are totally covered by an electrically insulating strip.

According to a preferred embodiment, the method comprises an additional step (iii) consisting in patterning at least the barrier film 11, and more particularly in forming pass-through openings 19 through the barrier film 11. The pass-through openings 19 can be of different sizes and of different shapes.

Figure 8:
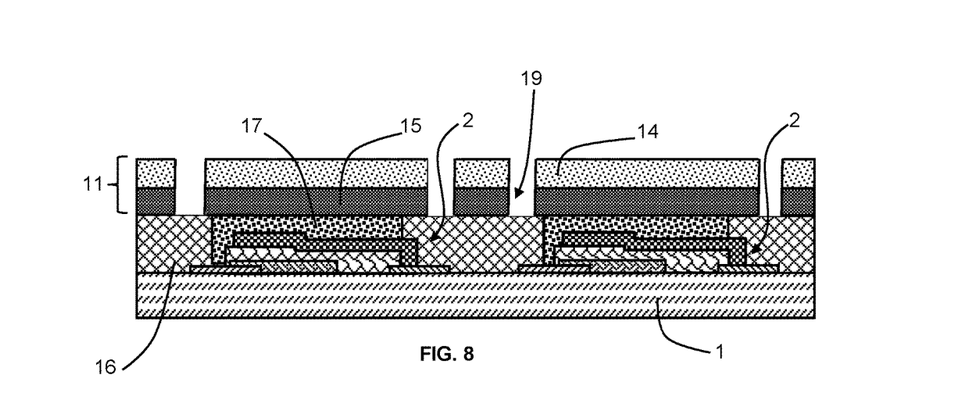

As represented in FIG. 8, two microbatteries are represented in cross-section. The openings 19 pass partially through the encapsulation layer 13.

In FIG. 8, the microbatteries are connected in series. The anode of the first microbattery is connected to the cathode of the second microbattery by the electrically conducting strip located in the centre of the figure.

The openings 19 formed through the barrier layer enable a contact connection to be made through said openings 19, at the level of the stack of active layers, thereby enabling access to the first and second electrodes of the stack of active layers.

The electrically conducting strips, accessible through the openings 19 passing through the barrier layer, are used to make the contact connections.

To achieve such a configuration, the insulating and conducting adhesive strips forming the adhesive film 12 are self-supported by lamination or sealing onto the host substrate 1 before the previously patterned barrier film 11 is added, respecting the location of the contact strips of the devices on the host substrate 1.

Alternatively, the barrier film can be patterned after it has been assembled with the substrate.

The openings 19 are advantageously located at the periphery of the device.

Transferring the contact connection to the periphery, in particular when several stacks are arranged on the same substrate, enables a better 3D integration to be achieved while at the same time enabling other components to be transferred onto the encapsulation layer. These openings are positioned facing at least one conducting strip and/or at least one current collector depending on the electric routing of the device.

The periphery can be situated at a distance of a few millimetres, for example from 1 to 10 mm, from the stack of active layers, at the level of the current collectors.

The geometry of the periphery will be chosen by the person skilled in the art so as to be able to perform the integration steps with other devices, such as soldering, without impairing the electrochemical properties of the batteries.

Figure 9:
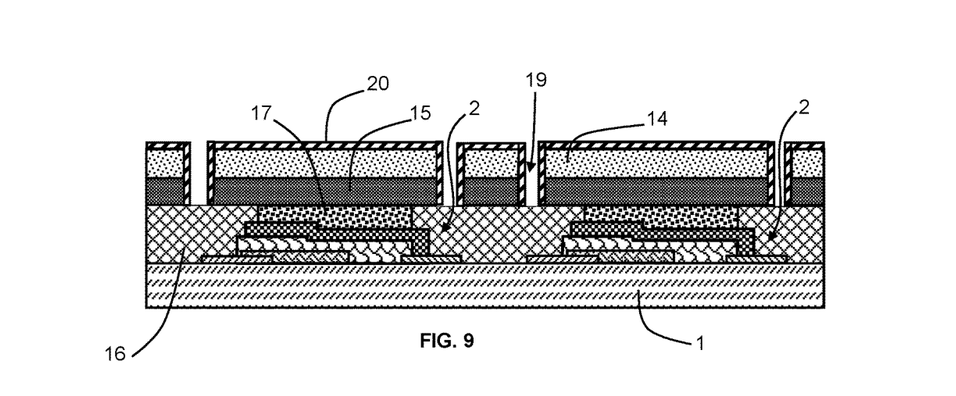

According to another preferred embodiment, represented in FIG. 9, an electrically insulating layer 20 is deposited on the patterned barrier layer. The flanks of the openings are advantageously both electrically insulated and protected from atmospheric oxidants and from moisture.

The lateral protection is for example improved by depositing a layer formed by an alumina base or an alumina layer with a thickness of a few nanometres.

The deposition can for example be a very conformal deposition performed at low temperature by suitable deposition techniques such as Atomic Layer Deposition (ALD). What is meant by low temperature are temperatures of less than 100° C. The optimal temperature of the ALD method is about 80° C.

The electrically insulating layer 20 advantageously forms an electric insulation if the barrier film 11 comprises one or more electrically conducting layers, such as metallic layers.

Preferentially, the thickness of the electrically insulating layer 20 is comprised between 10 nm and 50 nm.

The alumina layer can be deposited before or after the assembly step.

According to another particular embodiment, the pass-through openings 19 are made through the whole thickness of the encapsulation layer. The openings not only pass through the barrier film but also pass through the adhesive film 12.

Figure 10:
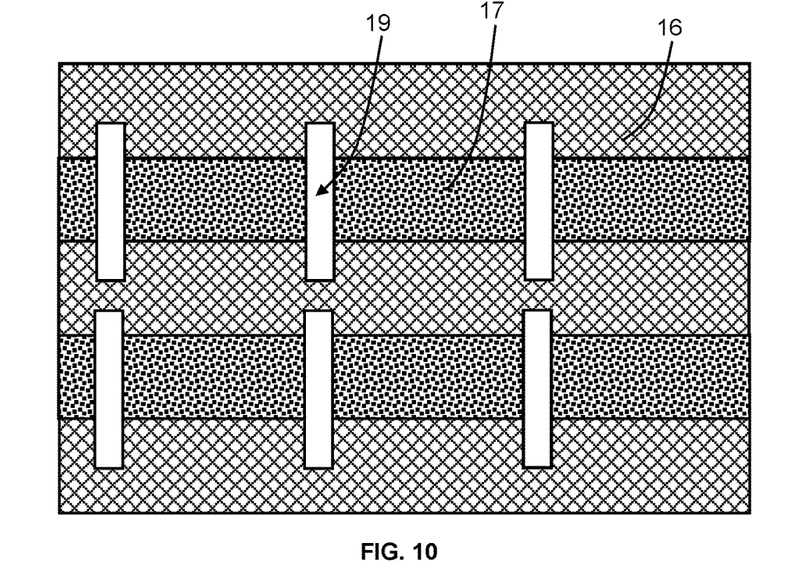
FIG. 10 represents a top view of an encapsulation layer according to a particular embodiment of the invention, in schematic manner.

The whole thickness of the encapsulation layer 13 is thus patterned. FIG. 10 represents a bottom view of an encapsulation layer 13 provided with pass-through openings 19.

Once the encapsulation layer 13 has been transferred onto the host substrate 1, the pass-through openings 19 form an access for the current collectors 9, 10 of the microbatteries, which facilitates formation of the electric contacts.

Figure 11:
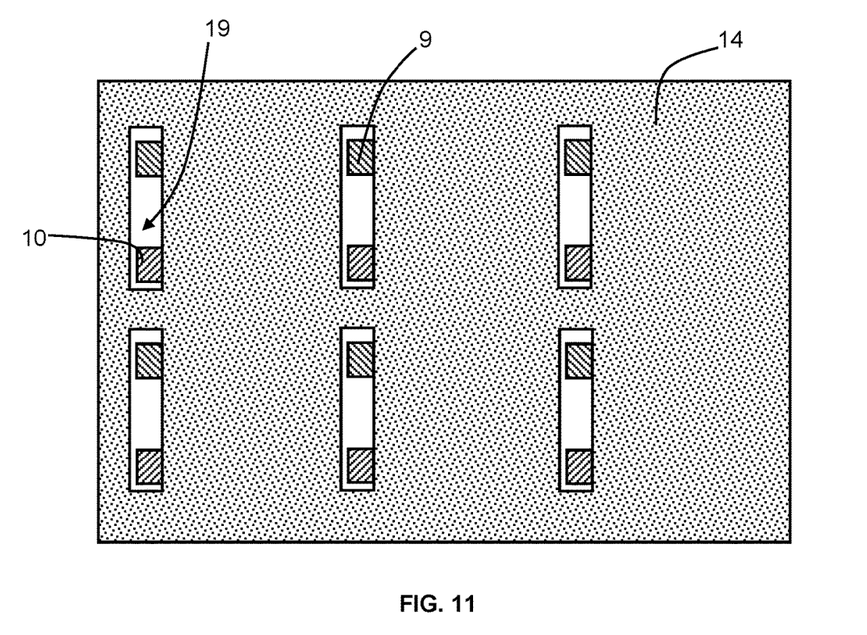
FIG. 11 represents several microbatteries arranged on the same substrate and covered by an encapsulation layer according to an embodiment of the invention, in schematic manner and in top view.

FIG. 11 represents a host substrate 1 provided with six unitary batteries on which an encapsulation layer 13 has been deposited. The encapsulation layer is provided with pass-through openings 19.

The alignment step between the encapsulation layer 13 and the host substrate 1 is facilitated by the geometric correspondence between the openings and the current collectors 9, 10. The openings 19 are used to align the encapsulation layer, and therefore the conducting and insulating strips, with the different components of the substrate during the transfer step.

Advantageously, these openings enable the air to be expelled when assembly is performed. Formation of bubbles between the encapsulation layer 13 and the active layers is thus prevented and the adhesion between the encapsulation layer 13 and the host substrate 1 is improved. The performances and the lifetime of the microbattery are thus increased.

Formation of the openings can be performed by localised etching techniques, such as a laser method or a mechanical removal method.

Figure 12:
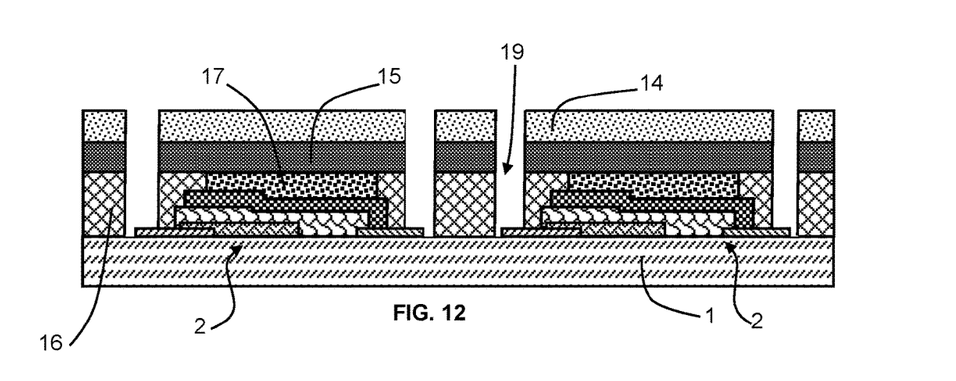
FIG. 12 represents two microbatteries covered by an encapsulation layer according to a particular embodiment, in schematic manner and in cross-section.

FIG. 12 is a cross-sectional view of a line of two batteries encapsulated by an encapsulation layer 13. The encapsulation layer comprises a bilayer barrier film 11 made from aluminium and PET and a barrier film 11 made from conducting and insulating adhesives. The openings 19 pass through the whole of the encapsulation layer 13.

The presence of the pass-through openings 19 offers the possibility of forming electric contacts located geometrically away from the active parts. This advantage facilitates the assembly and integration methods of the batteries with external circuits.

It is thus possible to combine the encapsulation and assembly operations of a set of batteries by means of a single process performed on the same host substrate 1 containing the different active parts connected in series or in parallel.

The encapsulation layer 13 obtained presents:
good barrier performances: the barrier level sought for is less than $10^{-4}$ and $10^{-5}$ g/m²/day,
a good mechanical strength: the encapsulation layer advantageously presents a Young's modulus of less than 5 GPa to be able to accommodate the volume variations of the microbattery, during the charge and discharge cycles. Otherwise, expansion or contraction of the microbattery could lead to mechanical damage in the electrodes, resulting in an irreversible reduction of the electric capacity,
a physical-chemical compatibility with the materials containing lithium. Formation of the encapsulation layer 13 does not damage the active layers.

According to another embodiment, the electrochemical device is an electrochromic system.

The "all-solid" electrochromic system is in the form of a stack of solid thin layers on a substrate 1 (FIG. 3). In particular, the electrochromic device successively comprises, starting from the substrate 1, a counter-electrode 7, an ionic conducting electrolyte 8, and an electrochromic active electrode 6.

The electrochromic active electrode is formed by an electrochromic material able to reversibly and simultaneously insert ions and electrons. Under the effect of a potential difference applied between the active electrode and the counter-electrode, the ions are inserted in the electrochromic material of the active electrode to give a persistent colouring of the corresponding oxidisation state.

By applying a reverse polarisation, the ions are extracted from the active electrode which reverts to its initial oxidisation state, coloured or transparent.

The oxidisation states of the electrochromic material consequently correspond to the inserted and extracted states and are of a distinct colouring when they are subjected to a suitable electric power supply.

Before the potential difference is applied, the displayed colour is that of the substrate, obtained by transmittance through the stack. After a potential difference has been applied between the active electrode and the counter-electrode, display of a different colour corresponding to that of the electrochromic material of the active electrode is obtained.

The encapsulation layer 13 is, in the case of electrochromic systems, transparent to light.

The active electrode 6 and/or the counter-electrode 4 is an electrode made from tungsten oxide, iridium oxide, vanadium oxide or molybdenum oxide.

The active electrode 6 is preferentially made from tungsten oxide or from molybdenum oxide.

The solid ionic conducting electrolyte layer 8 is made from a lithium base, for example from lithium nitride ($Li_3N$), LiPON, LiSiPON, or from LiBON etc.

The specific ion is advantageously the $Li^+$ lithium ion. The $Li^+$ lithium ion presents a greater mobility than other ions such as sodium or silver on account of the small size of the lithium ion, reducing the response time of the electrochromic system.

The counter-electrode 7 is for example made from iridium oxide or vanadium oxide.

The encapsulation layer 13 can be deposited with the same method on the electrochromic device.

By means of the encapsulation method described in the foregoing, it is possible to perform simultaneous and grouped protection of a set of lithium-based components (microbattery and/or electrochromic device) by an encapsulation system.

The encapsulation method is efficient and compatible with large volume production rates thereby enabling a maximum of components to be encapsulated in simultaneous manner.

As it is possible to locate the electric contacts of the components remotely with respect to the location of the active layers on the host substrate, the integration and interconnectivity operations are facilitated compared with commonly used methods.

It is possible to encapsulate and assemble several lithium microbatteries of the same type, arranged in series or in parallel. The encapsulation method of the batteries in series or in parallel remains identical.

Interconnection of several unitary batteries advantageously enables the electric power of the system obtained to be modulated by increasing the output voltage and/or the discharge capacity.

The self-supported stack can also be applied on a combination of microbatteries interconnected with other microelectronic devices (electrochromic, photovoltaic, etc.) made on the same host substrate. This advantage particularly provides a solution to the problem of producing multifunctional autonomous systems. It is further possible to provide for the electrically conducting strips to serve the purpose of electrically connecting one or more batteries with an electric load, for example a microelectronic device such as a printed circuit, a micromotor, and light emitting or light receiving device. For example purposes, the batteries can be assembled in a watch strap and are connected so as to supply electricity to the watch, for example its motor and/or its integrated circuits.

The invention claimed is:

1. An electrochemical device comprising
   (1) a substrate,
   (2) at least one stack of active layers containing lithium, said stack comprising
      (2a) at least a first electrode connected to a first current collector and
      (2b) at least a second electrode connected to a second current collector,
      said stack being arranged on the substrate
   (3) an encapsulation layer covering said at least one stack, the encapsulation layer comprising at least:
      (3a) a barrier film presenting at least one electrically insulating surface and comprising at least one layer hermetic to oxidising species,
      (3b) an adhesive film, provided with a first surface and a second surface,
         the first surface being in contact with the electrically insulating surface of the barrier film and
         the second surface covering a stack of active layers and a part of the substrate,
      wherein the adhesive film comprises a juxtaposition of electrically conducting adhesive strips and of electrically insulating adhesive strips,
      wherein two electrically conducting strips are separated by an electrically insulating strip to be electrically insulated from one another,
      each electrically conducting strip being connected to the first current collector or to the second current collector of the stack of active layers.

2. The device according to claim 1, wherein the encapsulation layer comprises openings passing through at least the barrier film so as to enable a contact connections to be made through the openings, the openings being advantageously located at the periphery of the device.

3. The device according to claim 1, wherein the barrier film is formed by one or more layers, the one or more layers being made from metal or from dielectric material, the first layer of said film being formed by a layer of dielectric material.

4. The device according to claim 1, wherein the electrically conducting strips are made from adhesive conducting polymer.

5. The device according to claim 4, wherein the electrically conducting strips are made from adhesive conducting polymer, said conducting polymer being chosen from polyacetylene, polythiophene, polypyrrole, and phenylene polysulfide, or an insulating polymer doped with metallic or conducting carbonated charges.

6. The device according to claim 1, wherein the electrically insulating adhesive strips are chosen from thermoplastic materials or materials able to be thermoset by UV or heat treatment.

7. The device according to claim 1, wherein the adhesive film comprises oxidising species traps.

8. The device according to claim 1, wherein the encapsulation layer has a thickness comprised between 30 μm and 100 μm.

9. The device according to claim 1, wherein the barrier film is covered by an electrically insulating layer.

10. The device according to claim 1, comprising several stacks of active layers arranged on the substrate,
    each electrically conducting strip connecting a first current collector of a stack of active layers with the second current collector of another stack of active layers, so as to connect said stacks of active layers in series.

11. The device according to claim 1, comprising several stacks of active layers arranged on the substrate,
    the first electrically conducting strip connecting the first current collectors of the stacks of active layers,
    the second electrically conducting strip connecting the second current collectors of the stacks of active layers,
    so as to connect the stacks of active layers in parallel.

12. A fabrication method of an electrochemical device comprising the following successive steps:
    (1) providing a substrate on which at least one stack of active layers is arranged, said stack comprising at least a first electrode connected to a first collector and at least a second electrode connected to a second collector,
    (2) providing a barrier film and an adhesive film
       the barrier film presenting at least one electrically insulating surface and comprising at least one layer hermetic to oxidising species,
       the adhesive film being provided with a first surface and a second surface,
       the adhesive film comprising a juxtaposition of electrically conducting adhesive strips and of electrically insulating adhesive strips,
       two electrically conducting strips being separated by an electrically insulating strip to be electrically insulated from one another,
    (3) securing the barrier film and the adhesive film with the substrate so as to encapsulate the stack of active layers, the barrier film and the adhesive film forming an encapsulation layer,
    the first surface of the adhesive film being in contact with the electrically insulating surface of the barrier film and the second surface of the adhesive film being designed to be partially in contact with the substrate,
    the adhesive film covering the stack of active layers and a part of the substrate,
    each strip of electrically conducting material being connected to the first current collector or to the second current collector of the stack of active layers.

13. The method according to claim 12, wherein the barrier film and the adhesive film are assembled to one another before being secured with the substrate.

14. The method according to claim 12, wherein the adhesive film is secured in a first step with the substrate and wherein the barrier film is subsequently assembled on the adhesive film.

15. The method according to claim 12, wherein the substrate comprises several stacks of active layers and wherein a single encapsulation layer is simultaneously arranged on the stacks.

16. The method according to claim 12, comprising a patterning step at least of the barrier film so as to form openings passing through the barrier film.

17. The method according to claim 16, wherein the patterning step is followed by a deposition step of an electrically insulating layer so as to cover the flanks of the openings formed at least in the barrier film.

18. The method according to claim 17, wherein the electrically insulating layer is made from alumina.

19. The method according to claim 12, wherein the barrier film and the adhesive film are secured with the substrate by lamination or by a sealing technique.

20. The method according to claim 12, wherein the barrier film is formed by an aluminium layer and by a polymer layer.

21. The method according to claim 12, wherein the electrically conducting strips are made from adhesive conducting polymer.

22. The method according to claim 21, wherein the electrically conducting strips are made from adhesive conducting polymer, said conducting polymer being chosen from polyacetylene, polythiophene, polypyrrole, and phenylene polysulfide, or an insulating polymer doped with metallic or conducting carbonated charges.

23. The method according to claim 12, wherein the electrically insulating adhesive strips are chosen from thermoplastic materials or materials able to be thermoset by UV curing or heat treatment.

24. The method according to claim 12, wherein the adhesive film comprises oxidising species traps.

* * * * *